(12) United States Patent
Ono

(10) Patent No.: US 9,606,334 B2
(45) Date of Patent: Mar. 28, 2017

(54) WIDE ANGLE LENS AND IMAGING APPARATUS

(71) Applicant: FUJIFILM Corporation, Tokyo (JP)

(72) Inventor: Kazunori Ono, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/724,010

(22) Filed: May 28, 2015

(65) Prior Publication Data

US 2015/0286037 A1   Oct. 8, 2015

Related U.S. Application Data

(63) Continuation of application No. PCT/JP2013/006936, filed on Nov. 26, 2013.

(30) Foreign Application Priority Data

Dec. 4, 2012   (JP) ................. 2012-264851

(51) Int. Cl.
  *G02B 13/04*  (2006.01)
  *G02B 13/00*  (2006.01)
  *G02B 1/04*   (2006.01)

(52) U.S. Cl.
  CPC ............ *G02B 13/04* (2013.01); *G02B 1/041* (2013.01); *G02B 13/002* (2013.01); *G02B 13/0045* (2013.01)

(58) Field of Classification Search
  CPC .................................................. G02B 13/04
  USPC ........................................................ 359/749
  See application file for complete search history.

(56) References Cited

U.S. PATENT DOCUMENTS

| 6,476,974 B1 | 11/2002 | Kreitzer |
| 2007/0217035 A1 | 9/2007 | Baba |
| 2008/0174887 A1 | 7/2008 | Asami |
| 2009/0296234 A1 | 12/2009 | Asami |
| 2010/0188757 A1 | 7/2010 | Saitoh |
| 2012/0170142 A1* | 7/2012 | Hsieh ........................ G02B 9/62 359/762 |

FOREIGN PATENT DOCUMENTS

| JP | 06-331889 | 12/1994 |
| JP | 11-119094 | 4/1999 |
| JP | 2002-098886 | 4/2002 |
| JP | 2004-145256 | 5/2004 |
| JP | 2004-523000 | 7/2004 |
| JP | 2006-145744 | 6/2006 |

(Continued)

OTHER PUBLICATIONS

International Search Report, PCT/JP2013/006936, Mar. 25, 2014.

*Primary Examiner* — James Jones
(74) *Attorney, Agent, or Firm* — Young & Thompson

(57) ABSTRACT

A wide angle lens consists essentially of a front group and a rear group in this order from an object side. The front group consists essentially of two negative lenses and a positive lens in this order from the object side, and all of the three lenses are made of an identical material. The rear group includes at least one positive lens and at least one negative lens, and a lens closest to an image side in the rear group is a negative lens. When a refractive index for d-line of the material of the lenses in the front group is NF, conditional expression (1): 1.48<NF<1.6 is satisfied.

14 Claims, 7 Drawing Sheets

EXAMPLE 1

(56) References Cited

FOREIGN PATENT DOCUMENTS

| JP | 2007-249073 | 9/2007 |
| JP | 2008-096621 | 4/2008 |
| JP | 2008-176183 | 7/2008 |
| JP | 2008-233610 | 10/2008 |
| JP | 2009-063877 | 3/2009 |
| JP | 2009-288300 | 12/2009 |

* cited by examiner

FIG.1  EXAMPLE 1
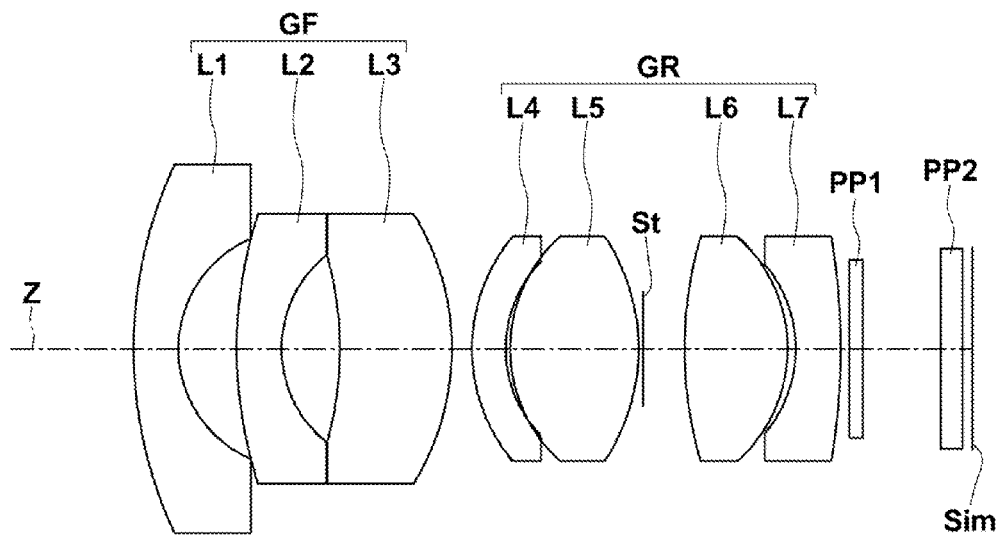
FIG.2  EXAMPLE 2
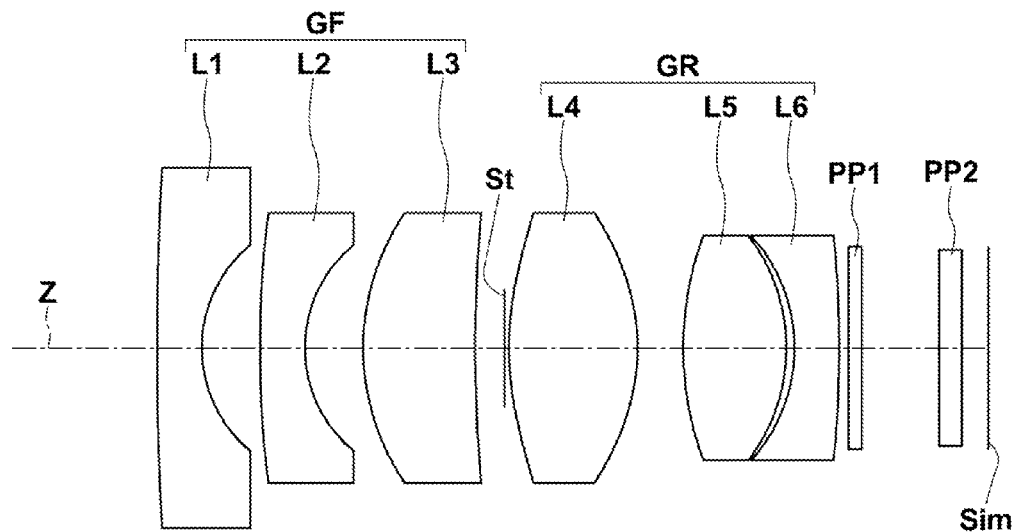

EXAMPLE 3

EXAMPLE 4

FIG.5  EXAMPLE 5
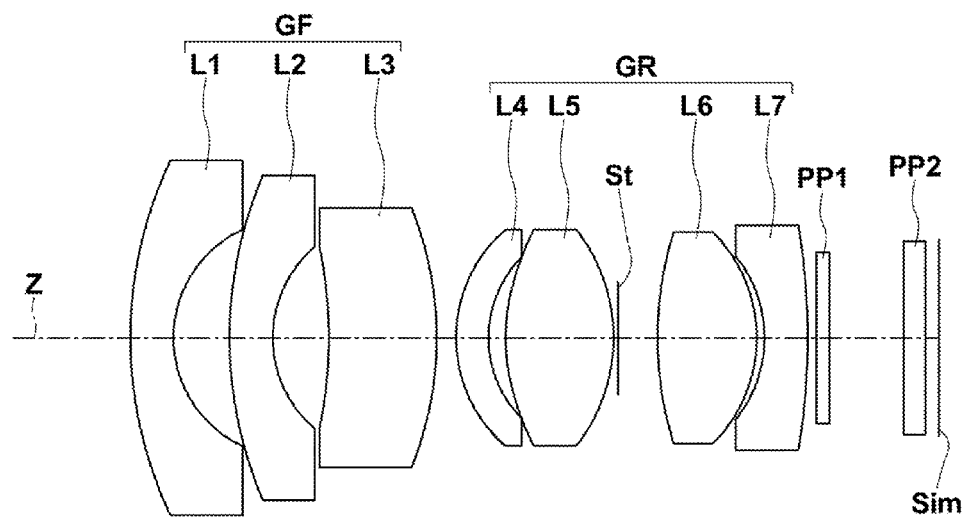
FIG.6  EXAMPLE 6
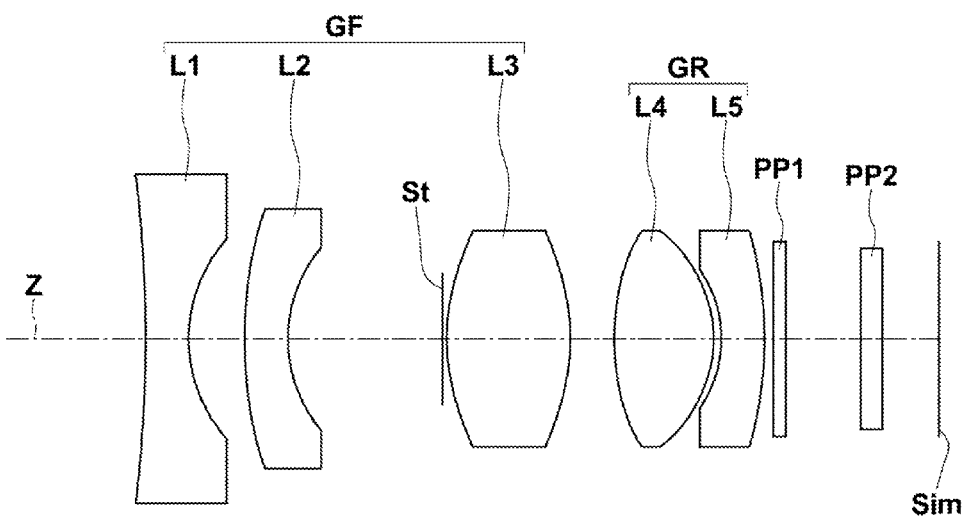

FIG.7
EXAMPLE 1
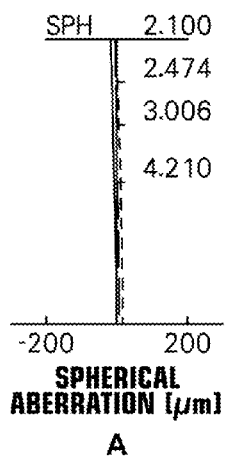
A
SPHERICAL ABERRATION [μm]
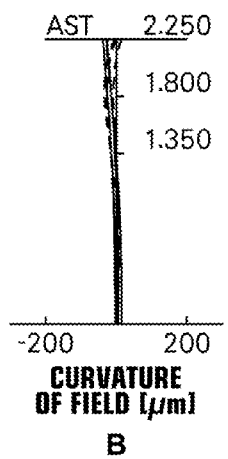
B
CURVATURE OF FIELD [μm]
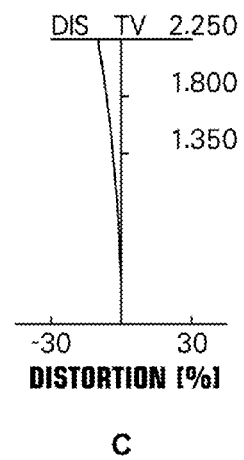
C
DISTORTION [%]
FIG.8
EXAMPLE 2
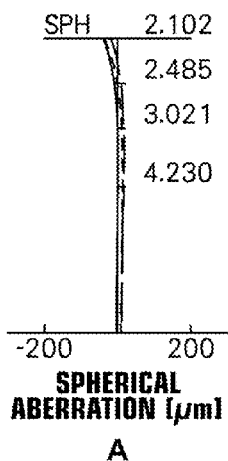
A
SPHERICAL ABERRATION [μm]
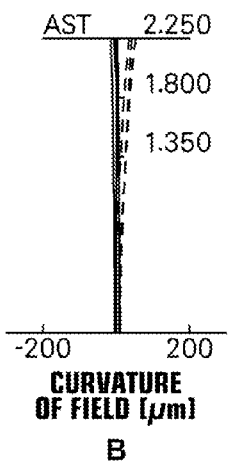
B
CURVATURE OF FIELD [μm]
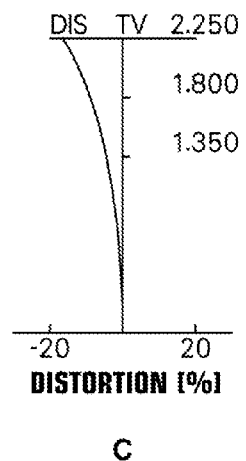
C
DISTORTION [%]

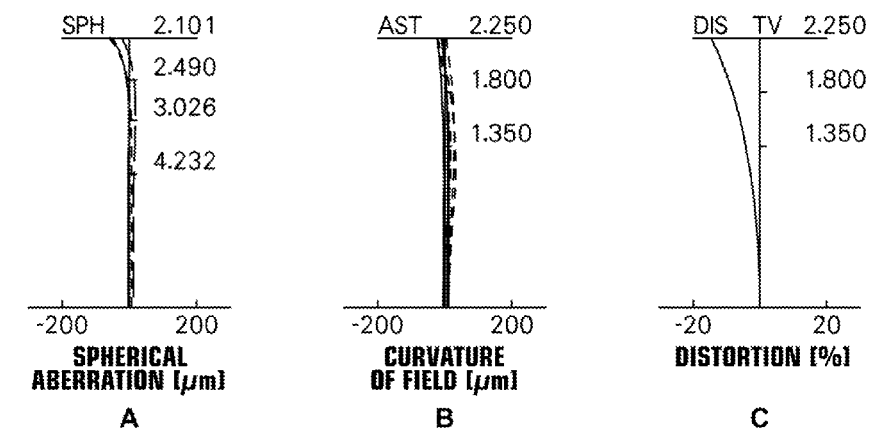
FIG.9 EXAMPLE 3
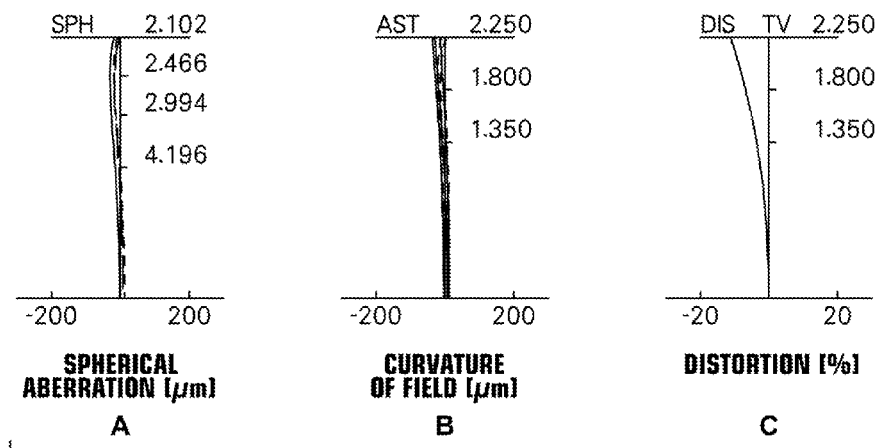
FIG.10 EXAMPLE 4

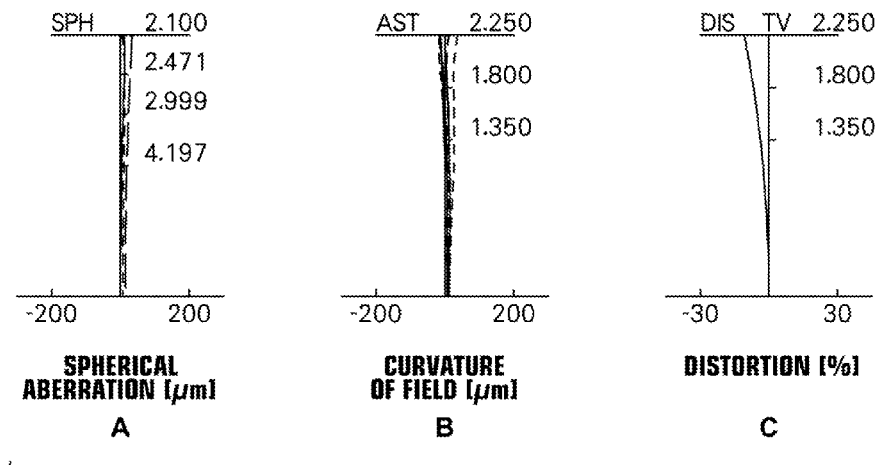
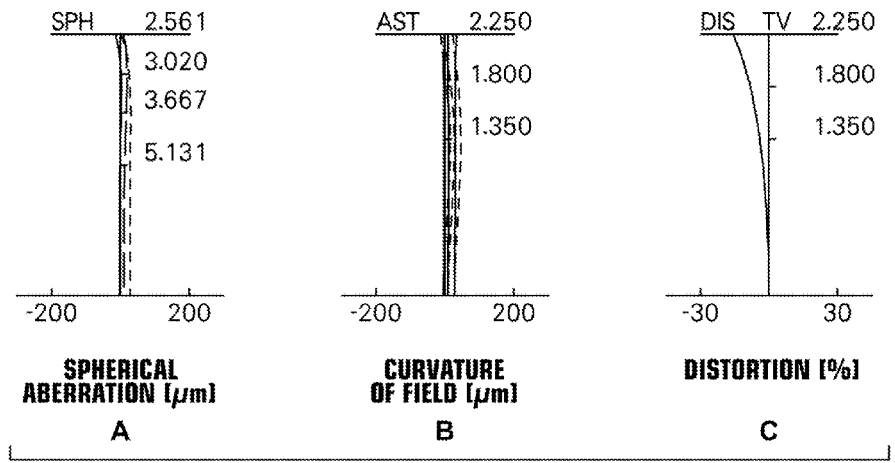

WIDE ANGLE LENS AND IMAGING APPARATUS

CROSS-REFERENCE TO RELATED APPLICATIONS

This application is a Continuation of PCT International Application No. PCT/JP2013/006936 filed on Nov. 26, 2013, which claims priority under 35 U.S.C. §119(a) to Japanese Patent Application No. 2012-264851 filed on Dec. 4, 2012. Each of the above applications is hereby expressly incorporated by reference, in its entirety, into the present application.

BACKGROUND OF THE INVENTION

Field of the Invention

The present invention relates to a wide angle lens and an imaging apparatus. In particular, the present invention relates to a wide angle lens that is usable in a camera for a mobile terminal, an in-vehicle camera or the like and especially appropriate for a surveillance camera, and also to an imaging apparatus including this wide angle lens.

Description of the Related Art

The size and the cost of kinds of lenses mountable on cameras in the aforementioned fields rapidly reduced in recent years. Especially, use of many plastic lenses has contributed to reduction in the size and the cost of the lens system.

As conventional lens systems using plastic lenses, lens systems disclosed, for example, in Japanese Unexamined Patent Publication No. 2009-288300 (Patent Document 1), Japanese Unexamined Patent Publication No. 2007-249073 (Patent Document 2), and PCT Japanese Publication No. 2004-523000 (Patent Document 3) are known. Patent Document 1 discloses a 6-element fish eye lens in which a glass lens is arranged closest to the object side and all the other lenses are plastic lenses. Patent Document 2 discloses a 6-element fish eye lens in which the first lens and the third lens from the object side are glass lenses and the other four lenses are plastic lenses. Patent Document 3 discloses a 6-element or 7-element lens system in which a plastic lens is arranged closest to the object side and all the other lenses are glass lenses, and an 8-element lens system in which the first lens and the second lens from the object side are plastic lenses and the other lenses are glass lenses.

SUMMARY OF THE INVENTION

The number of lenses constituting a lens system may be reduced to achieve reduction in the size and the cost of the lens system. However, if the lens system is simplified by excessively reducing the number of lenses constituting the lens system, the refractive power of each lens becomes too strong, and the molding characteristics deteriorates. Therefore, yield rates during molding and during assembly drop, and the lens system becomes less appropriate for production. Consequently, the cost for production increases.

In the lens systems disclosed in Patent Documents 1 and 2, a lens closest to the image side and a lens immediately before the lens are plastic lenses, and they have mutually strong refractive power to satisfy achromatic conditions. That lowers the molding characteristics and the assembly characteristics. Further, the lens systems disclosed in Patent Documents 1 and 2 use two kinds of plastic material. Therefore, at least two pairs of main molds are required during molding, and that increases the cost of molding. In the lens system disclosed in Patent Document 3, it is difficult to judge that the cost has been sufficiently reduced, and further reduction in cost should be possible.

In view of the foregoing circumstances, it is an object of the present invention to provide a wide angle lens that is configurable in small size and producible at low cost and has excellent optical performance, and an imaging apparatus including this wide angle lens.

A wide angle lens of the present invention consists essentially of a front group and a rear group in this order from an object side. The front group consists essentially of three lenses of two negative lenses and a positive lens in this order from the object side, and all of the three lenses are made of an identical material. The rear group includes at least one positive lens and at least one negative lens, and a lens closest to an image side in the rear group is a negative lens. The following conditional expression (1) is satisfied when a refractive index for d-line of the material of the lenses constituting the front group is NF:

$$1.48 < NF < 1.6 \tag{1}.$$

It is desirable that the wide angle lens of the present invention satisfies the following conditional expression (1'):

$$1.49 \leq NF < 1.57 \tag{1'}.$$

In the wide angle lens of the present invention, it is desirable that the following conditional expression (2) is satisfied when an Abbe number for d-line of the material of the lenses constituting the front group is vF. It is more desirable that the following conditional expression (2') is satisfied:

$$50 < vF < 65 \tag{2};$$

and $$53 < vF < 58 \tag{2'}.$$

In the wide angle lens of the present invention, it is desirable that the material of the lenses constituting the front group is plastic.

In the wide angle lens of the present invention, it is desirable that the material of the negative lens closest to the image side in the rear group is glass. Further, it is desirable that the following conditional expressions (3) and (4) are satisfied when a focal length of this negative lens and an Abbe number for d-line of this negative lens are fng and vng, respectively, and a focal length of an entire system is f. In that case, it is more desirable that the following conditional expression (3') is satisfied instead of the following conditional expression (3). It is more desirable that the following conditional expression (4') is satisfied instead of the conditional expression (4):

$$-2.2 < fng/f < -1.5 \tag{3};$$

$$15 < vng < 25 \tag{4};$$

$$-2.1 < fng/f < -1.6 \tag{3'};$$

and $$17 < vng < 24 \tag{4'}.$$

In the wide angle lens of the present invention, it is desirable that the material of the at least one positive lens included in the rear group is the same as the material of the lenses in the front group.

In the wide angle lens of the present invention, it is desirable that all of plastic lenses included in the front group and the rear group are made of an identical material. In that case, it is desirable that the plastic lenses included in the front group and the rear group are two negative lenses and at least two positive lenses.

An imaging apparatus of the present invention includes the wide angle lens of the present invention.

Here, the term "essentially" means that lenses substantially without any refractive power, optical elements other than lenses, such as a stop, a cover glass and filters, and the like may be included in addition to the mentioned composition elements.

The surface shape and the sign of the refractive power of the aforementioned lenses are considered in a paraxial region when an aspheric surface is included.

In the wide angle lens of the present invention, the lens configuration of the front group and the rear group is appropriately set. Further, all lenses in the front group are made of an identical material, and the refractive index of the material is regulated so as to satisfy conditional expression (1). Therefore, the wide angle lens is configurable in small size, and producible at low cost. Further, it is possible to give excellent optical performance to the wide angle lens.

The imaging apparatus of the present invention includes the wide angle lens of the present invention. Therefore, the imaging apparatus is configurable in small size and at low cost, and excellent images are obtainable.

BRIEF DESCRIPTION OF THE DRAWINGS

FIG. 1 is a cross section illustrating the lens configuration of a wide angle lens in Example 1 of the present invention;
FIG. 2 is a cross section illustrating the lens configuration of a wide angle lens in Example 2 of the present invention;
FIG. 5 is a cross section illustrating the lens configuration of a wide angle lens in Example 5 of the present invention;
FIG. 6 is a cross section illustrating the lens configuration of a wide angle lens in Example 6 of the present invention;
FIG. 7, Sections A through C are aberration diagrams of the wide angle lens in Example 1 of the present invention;
FIG. 8, Sections A through C are aberration diagrams of the wide angle lens in Example 2 of the present invention;
FIG. 9, Sections A through C are aberration diagrams of the wide angle lens in Example 3 of the present invention;
FIG. 10, Sections A through C are aberration diagrams of the wide angle lens in Example 4 of the present invention;
FIG. 11, Sections A through C are aberration diagrams of the wide angle lens in Example 5 of the present invention;
FIG. 12, Sections A through C are aberration diagrams of the wide angle lens in Example 6 of the present invention.

DESCRIPTION OF THE PREFERRED EMBODIMENTS

Figure 3:
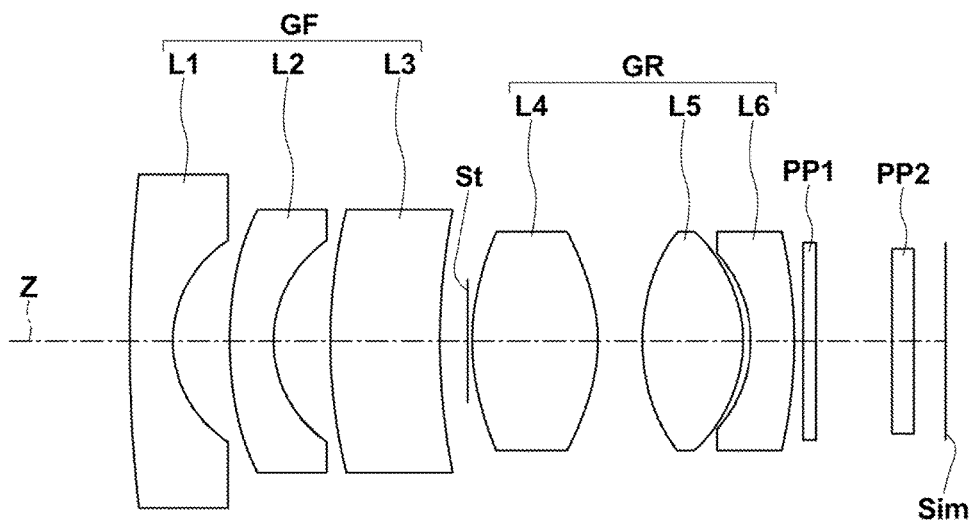
FIG. 3 is a cross section illustrating the lens configuration of a wide angle lens in Example 3 of the present invention.

Hereinafter, embodiments of the present invention will be described in detail with reference to drawings. FIG. 1 through FIG. 6 are cross sections illustrating the configuration of wide angle lenses according to the embodiments of the present invention. FIG. 1 through FIG. 6 correspond to Examples 1 through 6, which will be described later, respectively. In FIG. 1 through FIG. 6, the left side is an object side, and the right side is an image side. In each of FIG. 1 through FIG. 6, signs L1 through L7 are used independently from those used in the other figures to avoid complicating explanation due to an increase in the number of digits of the signs. Therefore, even if the same signs as those used in the other figures are assigned, the signs do not necessarily represent the same configuration. In the examples illustrated in FIG. 1 through FIG. 6, the schematic configuration and the illustration method are the same. Therefore, the embodiments of the present invention will be described mainly with reference to the example of configuration illustrated in FIG. 1, as a representative example.

The wide angle lens according to an embodiment of the present invention consists essentially of front group GF and rear group GR along optical axis in this order from the object side. For example, in the example illustrated in FIG. 1, front group GF consists of negative lens L1, negative lens L2 and positive lens L3 in this order from the object side. Rear group GR consists of negative lens L4, positive lens L5, aperture stop St, positive lens L6 and negative lens L7 in this order from the object side. Here, aperture stop St illustrated in the diagram does not represent the shape nor the size of the aperture stop, but the position of the aperture stop on the optical axis.

When this wide angle lens is applied to an imaging apparatus, it is desirable to arrange a cover glass and various filters, such as an infrared-ray-cut filter and a low-pass filter, between the optical system and image plane Sim based on the configuration of the camera side on which the lens is mounted. Therefore, FIG. 1 illustrates an example in which parallel-flat-plate-shaped optical members PP1, PP2, which are assumed to be such members, are arranged between a lens closest to the image side and image plane Sim.

In the wide angle lens according to an embodiment of the present invention, front group GF consists essentially of three lenses of two negative lenses and a positive lens in this order from the object side, and all of the three lenses in front group GF are made of an identical material. Rear group GR includes at least one positive lens and at least one negative lens, and a lens closest to the image side in rear group GR is a negative lens.

The arrangement of lenses in which the negative lenses are arranged at the frontmost position is advantageous to widening the angle of view. Further, the schematic arrangement of refractive power in the entire system, in which negative refractive power, positive refractive power, positive refractive power and negative refractive power are arranged in this order from the object side, makes the entire system symmetrical. Therefore, it is possible to achieve excellent image formation performance while the configuration of the entire system is simple.

Further, the aforementioned configuration makes it easy to configure front group GF as a negative lens group or an approximately afocal system having a low magnification ratio. In a negative lens group or an approximately afocal system having a low magnification ratio, it is possible to suppress chromatic aberrations to some extent even if lenses in the group or system are made of an identical material. Therefore, the configuration is advantageous also to correction of aberrations. Further, when front group GF is configured as a negative lens group or an approximately afocal system having a low magnification ratio, and the positive refractive power of rear group GR is weakened, it is possible to make the back focus of the entire system appropriately long, compared with the focal length of the entire system.

Therefore, it is possible to secure a space for arranging various filters or the like between the lens system and an image plane.

Further, it is possible to mold lenses at the same time by using a main mold even if the shapes of the lenses are different from each other. Therefore, when all the lenses in front group GF are made of an identical material, as described above, it is possible to mold these lenses at the same time by using the same main mold. That can reduce time for molding, and greatly reduce a cost for producing main molds. Hence, it is possible to greatly reduce the production cost.

Here, when lenses in different shapes are molded at the same time by using a main mold, it is necessary to make molding conditions, molding time and the like of the lenses uniform. That is achievable by making the maximum thickness and the maximum diameter of each lens substantially the same as those of the other lenses.

Further, the material of a lens or lenses included in rear group GR may be the same as the material of front group GF. Especially, it is desirable that the material of at least one positive lens included in rear group GR is the same as the material of front group GF. In that case, it is possible to mold at least four kinds of different lens at the same time by using a main mold. Therefore, further reduction in the cost of production is possible.

The material of lenses constituting front group GF may be glass. However, when the material is plastic, it is possible to produce the lenses at low cost. It is desirable that all of plastic lenses included in front group OF and rear group GR are made of an identical material. Conventionally, when different plastic materials were used, generally, main molds for the respective plastic materials were used, and only one kind of lens was molded by each of the main molds. In contrast, when all the plastic lenses in the entire system are made of an identical material, it is possible to mold plural kinds of different lens by a main mold. Therefore, it is possible to reduce the expense for molds, molding work and molding time.

Further, it is desirable that the plastic lenses included in front group GF and rear group GR are two negative lenses and at least two positive lenses. It is desirable that the number of plastic lenses having negative refractive power in the entire system is two to reduce the size and the cost while maintaining excellent image formation performance. A change in the refractive index of plastic by a change in temperature is one digit greater than a change in the refractive index of glass. Therefore, a change in the focus of a plastic lens by a change in temperature is not ignorable. When two negative lenses and two positive lenses are at least plastic lenses, it is possible to make the change in focus by the positive lenses and the change in focus by the negative lenses almost cancel out each other. Therefore, it is possible to reduce a change in the focus of the entire system during temperature change.

A material satisfying the following conditional expression (1) is selected, as the material of the lenses constituting front group GF:

$$1.48 < NF < 1.6 \tag{1},$$

where a refractive index for d-line of the material constituting the lenses in front group is NF.

If the lower limit of conditional expression (1) is not satisfied, it becomes difficult to obtain a material at low cost. Further, the refractive index becomes too low, and the absolute value of the curvature of each lens surface becomes large. Consequently, performance deteriorates, and processability and moldability also deteriorate. If the upper limit of conditional expression (1) is not satisfied, when the material is plastic, it is difficult to obtain appropriate material having low dispersion. When the material is glass, it is difficult to use inexpensive material. When conditional expression (1) is satisfied, it is possible to produce a lens system having excellent performance at low cost.

Therefore, it is desirable that the following conditional expression (1') is satisfied instead of conditional expression (1):

$$1.49 \le NF < 1.57 \tag{1'}.$$

Further, it is desirable that the material of the lenses constituting front group GF satisfies the following conditional expression (2):

$$50 < vF < 65 \tag{2},$$

where an Abbe number for d-line of the material of the lenses constituting the front group is vF.

Conditional expression (2) may be regarded as a condition for achieving achromatization while the lenses are made of an identical material. If the lower limit of conditional expression (2) is not satisfied, it becomes difficult to remove chromatic aberrations. Further, it is desirable that rear group GR includes a lens made of the same material as the material of front group GF to reduce the cost. However, if the lower limit of conditional expression (2) is not satisfied, it becomes difficult to configure rear group GR in such a manner to include a lens made of the same material as the material of front group GF. If the upper limit of conditional expression (2) is not satisfied, it becomes difficult to use inexpensive material. When conditional expression (2) is satisfied, it is possible to excellently correct chromatic aberrations, and to lower the cost.

Therefore, it is desirable that the following conditional expression (2') is satisfied instead of conditional expression (2):

$$53 < vF < 58 \tag{2'}.$$

Further, it is desirable that the material of the negative lens closest to the image side in rear group GR is glass. It is desirable that the following conditional expression (3) is satisfied:

$$-2.2 < fng/f < -1.5 \tag{3},$$

where a focal length of this negative lens is fng and a focal length of an entire system is f.

Conditional expression (3) regulates the refractive power of the lens closest to the image side in the entire system when this lens is a glass lens. If the lower limit of conditional expression (3) is not satisfied, the negative refractive power of the negative lens closest to the image side in rear group GR becomes too weak, and problems that it is impossible to excellently maintain chromatic aberrations of the entire system and it is impossible to excellently maintain the characteristics of the image plane arise. Chromatic aberrations and the characteristics of the image plane deteriorate also when the upper limit of conditional expression (3) is not satisfied. It is necessary to increase the positive refractive power of the positive lens closest to the negative lens closest to the image side in rear group GR to improve the chromatic aberrations and the characteristics of the image plane. If the positive refractive power is increased, a spherical aberration deteriorates, and performance at a center is damaged. The performance at the center may be improved by adopting an aspheric surface, but in that case, off-axial image formation performance deteriorates. Therefore, that is not desirable after all.

Further, it is desirable that the material of the negative lens closest to the image side in rear group GR is glass and that the following conditional expression (4) is satisfied:

$$15 < \nu ng < 25 \tag{4}$$

where an Abbe number for d-line of this negative lens is νng.

Conditional expression (4) regulates the Abbe number of the lens closest to the image side in the entire system when this lens is a glass lens. If the lower limit of conditional expression (4) is not satisfied, obtainment of the material becomes difficult. Further, it becomes more difficult to correct remaining chromatic aberrations generated by front group GF, which consists of lenses made of an identical material, by rear group GR. If the upper limit of conditional expression (4) is not satisfied, correction of chromatic aberrations of the entire system becomes insufficient, and it becomes necessary to increase the negative refractive power of the negative lens closest to the image side in rear group GR. That adversely affects image formation performance in the whole image formation area.

When conditional expressions (3) and (4) are satisfied, it is possible to maintain excellent image formation performance in the whole image formation area while chromatic aberrations of the entire system are kept in an allowable range. When a negative lens made of material satisfying conditional expressions (3) and (4) is arranged closest to the image side in rear group OR, it is possible to excellently maintain chromatic aberrations and image formation performance in the entire system by correcting remaining chromatic aberrations generated by front group GF, which consists of lenses made of an identical material. Further, it is possible to easily use an identical material for many lenses in the entire system. When a glass lens satisfying conditional expressions (3) and (4) is used, it is possible to achieve a wide angle lens having small chromatic aberrations and high performance. That is effective especially when lenses in front group GF are made of plastic.

Therefore, it is more desirable that the following conditional expression (3') is satisfied instead of conditional expression (3):

$$-2.1 < fng/f < -1.6 \tag{3'}$$

Therefore, it is more desirable that the following conditional expression (4') is satisfied instead of conditional expression (4):

$$17 < \nu ng < 24 \tag{4'}$$

As a specific configuration of front group GF, front group GF may consist of a negative meniscus lens with its convex surface facing the object side, a negative meniscus lens with its convex surface facing the object side and a positive meniscus lens in this order from the object side. Alternatively, front group GF may consist of a negative meniscus lens with its convex surface facing the object side, a negative meniscus lens with its convex surface facing the object side and a biconvex lens in this order from the object side. Here, the first lens and the second lens from the object side in front group GF may be the same lenses. In this case, it is possible to greatly reduce cost.

As a specific configuration of rear group GR, rear group GR may consist of four lenses of a negative meniscus lens with its convex surface facing the object side, a biconvex lens, a biconvex lens, and a negative meniscus lens with its concave surface facing the object side in this order from the object side. This configuration is advantageous to excellent correction of chromatic aberrations. Alternatively, rear group GR may consist of three lenses of a biconvex lens, a biconvex lens, and a negative meniscus lens with its concave surface facing the object side in this order from the object side. In this case, it is possible to lower the cost, compared with a case in which rear group GR consists of four lenses. Rear group GR may consist of two lenses of a biconvex lens and a negative meniscus lens with its concave surface facing the object side in this order from the object side. In this case, it is possible to further lower the cost. Here, when rear group GR consists of two lenses, it is desirable that the lens closest to the object side in front group GF is a biconcave lens.

It is desirable that aperture stop St is located closer to the image side than the second lens from the object side in the entire system, and closer to the object side than the second lens from the image side in the entire system. In this case, it is possible to reduce the size and the cost of the system by suppressing the lens diameter of the system.

As described above, according to the wide angle lens in the embodiment of the present invention, it is possible to reduce cost without excessively reducing the number of lenses while maintaining performance. Here, the aforementioned desirable configurations may be combined in an arbitrary manner. It is desirable that the configurations are optionally adopted in an appropriate manner based on required specification of the wide angle lens.

Next, specific examples of the wide angle lens of the present invention will be described.

Example 1

FIG. 1 is a diagram illustrating the lens configuration of a wide angle lens in Example 1. Since its illustration method has been described already, repetition of the explanation is omitted here.

As the schematic configuration of a wide angle lens in Example 1, the wide angle lens consists essentially of front group GF and rear group GR in this order from the object side. Front group GF consists of lens L1 having negative meniscus shape with its convex surface facing the object side, lens L2 having negative meniscus shape with its convex surface facing the object side and lens L3 having positive meniscus shape with its convex surface facing the image side in this order from the object side. Rear group GR consists of lens L4 having negative meniscus shape with its convex surface facing the object side, lens L5 having biconvex shape, aperture stop St, lens L6 having biconvex shape, and lens L7 having negative meniscus shape with its concave surface facing the object side in this order from the object side. The entire system consists of seven lenses. All of the lenses are single lenses, which are not cemented together. In the aforementioned schematic configuration, the lens shape is a shape in a paraxial region. In the wide angle lens in Example 1, lenses L1, L2 and L5 are aspheric lenses. Four lenses of lenses L1 through L3 and L5 are made of an identical material of plastic, and lenses L4, L6 and L7 are made of glass.

As numerical value data representing the detailed configuration of the wide angle lens in Example 1, Table 1 shows basic lens data and Table 2 shows aspherical coefficients. The top row of Table 1, which is outside the box, shows focal length f of the entire system, air-equivalent back focus Bf, F-number FNo, and full angle of view 2ω).

In Table 1, a column of Si shows the surface number of an i-th (i=1, 2, 3, ...) surface when an object-side surface of a composition element closest to the object side is the first surface and the surface numbers sequentially increase toward the image side. A column of Ri shows the curvature radius of the i-th surface. A column of Di shows a distance, on optical axis Z, between the i-th surface and an (i+1)th surface. Here, the sign of a curvature radius is positive when a surface shape is convex toward the object side, and negative when a surface shape is convex toward the image side.

A column of Ndi shows the refractive index of a medium between the i-th surface and (i+1)th surface for d-line (wavelength is 587.56 nm). A column of vdj shows the Abbe number of the j-th (j=1, 2, 3, . . . ) optical element for d-line when a composition element closest to the object side is the first composition element and the numbers sequentially increase toward the image side. Here, the basic lens data include also aperture stop St and optical members PP1 and PP2. In the column of surface numbers, a surface number and the term "(St)" are written in a row of the surface number of a surface corresponding to aperture stop St, and a surface number and the term "(IMG)" are written in a row of the surface number of a surface corresponding to an image plane.

In the basic lens data of Table 1, mark * is attached to the surface number of an aspheric surface. Table 1 shows, as the curvature radius of the aspheric surface, the numerical value of a paraxial curvature radius. Table 2 shows aspherical coefficients about the aspheric surfaces. In the numerical values of Table 2, "E-n" (n: integer) means "$\times 10^{-n}$". The aspherical coefficients are values of coefficients κ, Am (m=4, 6, 8, 10, 12) in an aspherical equation represented by the following equation (A). Here, Σ in equation (A) represents a sum about the term of m. In the table of aspherical coefficients, a blank box means that the value is 0:

$$Zd = C \cdot y^2 / \{1 + (1 - \kappa \cdot C^2 \cdot y^2)^{1/2}\} + \Sigma Am \cdot y^m \quad (A),$$

where

Zd: depth of an aspheric surface (the length of a perpendicular from a point on the aspheric surface at height y to a flat plane that contacts with the vertex of the aspheric surface and is perpendicular to the optical axis), y: height (the length from the optical axis to the lens surface), C: paraxial curvature, and κ, Am: aspherical coefficients (m=4, 6, 8, 10, 12).

In the basic lens data, degrees are used as the unit of angles, and mm is used as the unit of lengths. However, since an optical system is usable by being proportionally enlarged or proportionally reduced, other appropriate units may be used. Further, each of the following tables shows numerical values rounded at predetermined digits.

TABLE 1 f = 2.314, Bf = 2.667, FNo. = 2.100, 2ω = 107.497°

| Si | Ri | Di | Ndi | vdj |
|---|---|---|---|---|
| 1 | 9.6292 | 1.000 | 1.50956 | 56.5 |
| 2* | 2.6725 | 1.300 | 1.00000 | |
| 3 | 9.6292 | 1.000 | 1.50956 | 56.5 |
| 4* | 2.6725 | 1.300 | 1.00000 | |
| 5 | −7.6693 | 2.500 | 1.50596 | 56.5 |
| 6 | −5.6728 | 0.450 | 1.00000 | |
| 7 | 3.8962 | 0.750 | 1.85026 | 32.3 |
| 8 | 2.7669 | 0.100 | 1.00000 | |

TABLE 1-continued f = 2.314, Bf = 2.667, FNo. = 2.100, 2ω = 107.497°

| Si | Ri | Di | Ndi | vdj |
|---|---|---|---|---|
| 9* | 3.3088 | 2.870 | 1.50956 | 56.5 |
| 10* | −4.3181 | 0.100 | 1.00000 | |
| 11(St) | ∞ | 0.920 | 1.00000 | |
| 12 | 8.7840 | 2.300 | 1.80400 | 46.6 |
| 13 | −3.3405 | 0.180 | 1.00000 | |
| 14 | −2.9194 | 1.000 | 1.92286 | 18.9 |
| 15 | −15.4653 | 0.200 | 1.00000 | |
| 16 | ∞ | 0.300 | 1.51633 | 64.1 |
| 17 | ∞ | 1.730 | 1.00000 | |
| 18 | ∞ | 0.500 | 1.51633 | 64.1 |
| 19 | ∞ | 0.209 | 1.00000 | |
| 20(IMG) | ∞ | | | |

TABLE 2

| SURFACE | κ | A4 | A6 | A8 | A10 | A12 |
|---|---|---|---|---|---|---|
| 2* | 1.00000E+00 | 2.87279E−04 | 3.97431E−08 | 1.00975E−12 | 1.89295E−17 | 2.82910E−22 |
| 4* | 1.00000E+00 | 2.87279E−04 | 3.97431E−08 | 1.00975E−12 | 1.89295E−17 | 2.82910E−22 |
| 9* | 1.00000E+00 | −6.63574E−04 | 1.26971E−09 | 5.56467E−14 | 4.83322E−19 | |
| 10* | 1.00000E+00 | 9.57566E−04 | 3.78546E−09 | −4.77653E−15 | −1.48720E−19 | |

FIG. 7, Sections A through C illustrate aberration diagrams of a spherical aberration, curvature of field, and distortion of the wide angle lens in Example 1, respectively, when the wide angle lens is focused on an object at infinity. The diagram of a spherical aberration illustrates an aberration for d-line by a solid line, an aberration for g-line (wavelength is 435.84 nm) by a short broken line, and an aberration for C-line (wavelength is 656.27 nm) by a long broken line. The diagram of curvature of field illustrates aberrations for d-line, g-line and C-line, and an aberration in a sagittal direction is illustrated by a solid line, and an aberration in a tangential direction is illustrated by a dotted line. The diagram of distortion illustrates an aberration for d-line. The vertical axis of the diagram of the spherical aberration corresponds to F-numbers. In the diagram of curvature of field and the diagram of distortion, the vertical axes represent image height (unit is mm), and the minimum values of the vertical axes are 0.

Image height of 0 represents a point on the optical axis. Therefore, the value of curvature of field in the sagittal direction and the value of curvature of field in the tangential direction are the same when the image height is 0. In the diagram of curvature of field, aberration curves for respective wavelengths at image height of 0 are arranged in the same order as aberration curves for respective wavelengths at the lowest position of the vertical axis in the diagram of the spherical aberration. For example, when an aberration curve for d-line, an aberration curve for C-line and an aberration curve for g-line are arranged in this order from the left side at the lowest position of the vertical axis in the diagram of the spherical aberration, aberration curves are similarly arranged at the position of the image height of 0 in the diagram of curvature of field. Aberration curves for d-line in a sagittal direction and in a tangential direction, aberration curves for C-line in a sagittal direction and in a tangential direction, and aberration curves for g-line in a sagittal direction and in a tangential direction are arranged in this order from the left side.

The aberration diagram of distortion illustrates distortion by TV distortion. A degree of distortion of an object image perpendicular to an optical axis, formed by an optical system, of a flat-surface object perpendicular to the optical axis is represented as distortion. In the field of photographic lenses or the like, a numerical value obtained by dividing a difference between an ideal image height and an actual image height by the ideal image height, and expressed in percentage is generally used as distortion. However, in the field of TV lenses, a definition expression different from this definition is used, and distinguished, as TV distortion. This definition uses the amount of curvature of a long side on a TV screen, as a distortion amount to be measured.

Specifically, TV distortion DTV is a value obtained by dividing depth Δh of curvature of a long side by vertical screen length $2h$, and expressed in percentage. TV distortion DTV is represented by the following equation:

DTV=Δh/2h×100.

In the aberration diagram of distortion, heights from the center of the optical axis to four points in four diagonal directions of a display screen are regarded as actual image height Y from the optical axis, and a rectangular flat-surface object toward the object side of a flat-surface image connecting these four points is assumed, and an actual image height at a central part of a long side of this image is regarded as h, and a difference between the perpendicular height of a point on the diagonal lines of this image from the optical axis and h is regarded as Δh. Therefore, the numerical value of TV distortion differs depending on the aspect ratio of a display screen. In the aberration diagram of distortion illustrated in FIG. 7, Section C, the TV distortion is calculated by using the ratio of 3:4, which is a general ratio for a TV screen.

Since the signs, meaning, description method and the like of data, which have been described in the explanation of Example 1, are similar in the following examples unless otherwise mentioned, redundant explanation will be omitted. Further, in the schematic configuration that will be described in the following examples, the shape of a lens is a shape in a paraxial region.

Example 2

FIG. 2 is a diagram illustrating the lens configuration of a wide angle lens in Example 2. The schematic configuration of the wide angle lens in Example 2 is substantially similar to the configuration of the wide angle lens in Example 1. Example 2 differs from Example 1 in that the entire system consists of six lenses, and that lens L3 has a positive meniscus shape with its convex surface facing the object side, and that rear group GR consists of lens L4 having a biconvex shape, lens L5 having a biconvex shape and lens L6 having a negative meniscus shape with its concave surface facing the object side in this order from the object side, and that aperture stop St is arranged between front group GF and rear group GR, and that aspheric lenses are lenses L2 and L4, and that four lenses of lenses L1 through L4 are made of an identical material of plastic, and that lenses L5 and L6 are made of glass.

Table 3 and Table 4 show basic lens data and aspherical coefficients of Example 2, respectively. FIG. 8, Sections A through C illustrate aberration diagrams of a spherical aberration, curvature of field, and distortion of the wide angle lens in Example 2, respectively, when the wide angle lens is focused on an object at infinity.

TABLE 3

| f = 2.417, Bf = 3.046, FNo. = 2.102, 2ω = 115.434° | | | | |
|---|---|---|---|---|
| Si | Ri | Di | Ndi | νdj |
| 1 | 70.1237 | 1.000 | 1.53450 | 55.7 |
| 2 | 2.9720 | 1.300 | 1.00000 | |
| 3* | 29.5659 | 1.000 | 1.53450 | 55.7 |
| 4* | 2.9720 | 1.300 | 1.00000 | |
| 5 | 5.3181 | 2.500 | 1.53450 | 55.7 |
| 6 | 34.6823 | 0.650 | 1.00000 | |
| 7(St) | ∞ | 0.100 | 1.00000 | |
| 8* | 6.6676 | 2.870 | 1.53450 | 55.7 |
| 9* | −4.5949 | 1.020 | 1.00000 | |
| 10 | 7.1855 | 2.300 | 1.72916 | 54.7 |
| 11 | −4.0949 | 0.180 | 1.00000 | |
| 12 | −3.7100 | 1.000 | 1.94595 | 18.0 |
| 13 | −24.4356 | 0.200 | 1.00000 | |
| 14 | ∞ | 0.300 | 1.51633 | 64.1 |
| 15 | ∞ | 1.730 | 1.00000 | |
| 16 | ∞ | 0.500 | 1.51633 | 64.1 |
| 17 | ∞ | 0.588 | 1.00000 | |
| 18(IMG) | ∞ | | | |

TABLE 4

| SURFACE | κ | A4 | A6 | A8 | A10 | A12 |
|---|---|---|---|---|---|---|
| 3* | 1.00000E+00 | 4.38109E−04 | −6.20222E−08 | −1.28599E−12 | −2.26229E−17 | |
| 4* | 1.00000E+00 | 2.10650E−04 | 7.56154E−08 | 1.35389E−12 | 2.10500E−17 | 2.44350E−22 |
| 8* | 1.00000E+00 | −2.09807E−03 | −1.03999E−07 | −1.02744E−12 | −8.00465E−18 | |
| 9* | 1.00000E+00 | 1.94089E−03 | 1.15053E−07 | 1.35726E−12 | 1.25006E−17 | |

Example 3

FIG. 3 is a diagram illustrating the lens configuration of a wide angle lens in Example 3. The schematic configuration of the wide angle lens in Example 3 is substantially similar to the configuration of the wide angle lens in Example 2. Example 3 differs from Example 2 in that aspheric lenses are lenses L1, L2, L4 and L5, and that five lenses of lenses L1 through L5 are made of an identical material of plastic, and that lens L6 is made of glass. Table 5 and Table 6 show basic lens data and aspherical coefficients of Example 3, respectively. FIG. 9, Sections A through C illustrate aberration diagrams of a spherical aberration, curvature of field, and distortion of the wide angle lens in Example 3, respectively, when the wide angle lens is focused on an object at infinity.

TABLE 5

| f = 2.363, Bf = 3.178, FNo. = 2.100, 2ω = 113.828° | | | | |
|---|---|---|---|---|
| Si | Ri | Di | Ndi | νdj |
| 1 | 33.9518 | 1.000 | 1.53450 | 55.7 |
| 2* | 2.7329 | 1.300 | 1.00000 | |
| 3* | 8.9381 | 1.000 | 1.53450 | 55.7 |
| 4* | 2.8069 | 1.300 | 1.00000 | |
| 5 | 12.5440 | 2.500 | 1.53450 | 55.7 |
| 6 | 15.5176 | 0.650 | 1.00000 | |

TABLE 5-continued f = 2.363, Bf = 3.178, FNo. = 2.100, 2ω = 113.828°

| Si | Ri | Di | Ndi | vdj |
|---|---|---|---|---|
| 7(St) | ∞ | 0.100 | 1.00000 | |
| 8* | 5.3168 | 2.870 | 1.53450 | 55.7 |
| 9* | −4.0414 | 1.020 | 1.00000 | |
| 10* | 4.9588 | 2.300 | 1.53450 | 55.7 |
| 11* | −3.1332 | 0.180 | 1.00000 | |
| 12 | −2.9763 | 1.000 | 1.94595 | 18.0 |
| 13 | −11.0637 | 0.200 | 1.00000 | |
| 14 | ∞ | 0.300 | 1.51633 | 64.1 |
| 15 | ∞ | 1.730 | 1.00000 | |
| 16 | ∞ | 0.500 | 1.51633 | 64.1 |
| 17 | ∞ | 0.588 | 1.00000 | |
| 18(IMG) | ∞ | | | |

TABLE 6

| SURFACE | κ | A4 | A6 | A8 | A10 | A12 |
|---|---|---|---|---|---|---|
| 2* | 1.00000E+00 | 2.44682E−04 | 3.14019E−08 | 8.19535E−13 | 1.58276E−17 | 2.44350E−22 |
| 3* | 1.00000E+00 | 1.38927E−03 | −1.24432E−08 | −1.41825E−12 | −3.18088E−17 | |
| 4* | 1.00000E+00 | 7.69196E−04 | 4.81022E−08 | 1.22858E−12 | 2.12860E−17 | 2.44350E−22 |
| 8* | 1.00000E+00 | −1.75104E−03 | −4.23896E−07 | −4.14511E−12 | −3.13075E−17 | |
| 9* | 1.00000E+00 | 4.03351E−03 | 3.60362E−07 | 4.02039E−12 | 3.30343E−17 | |
| 10* | 1.00000E+00 | 3.18677E−03 | −7.05423E−08 | −4.68856E−13 | −1.07702E−18 | |
| 11* | 1.00000E+00 | 3.23707E−03 | 4.82389E−08 | 1.45878E−13 | −3.68242E−18 | |

Example 4

Figure 4:
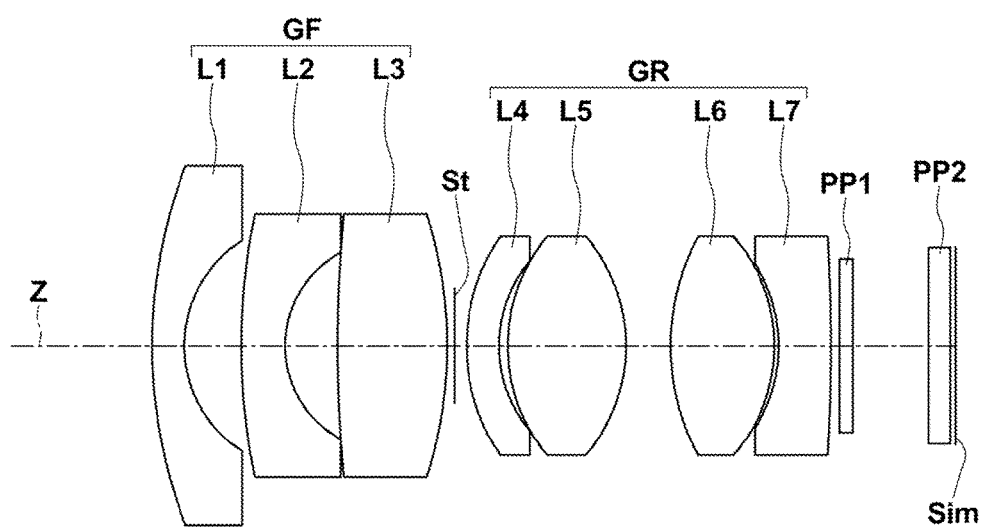
FIG. 4 is a cross section illustrating the lens configuration of a wide angle lens in Example 4 of the present invention.

FIG. 4 is a diagram illustrating the lens configuration of a wide angle lens in Example 4. The schematic configuration of the wide angle lens in Example 4 is substantially similar to the configuration of the wide angle lens in Example 1. Example 4 differs from Example 1 in that lens L3 has a biconvex shape, and that aperture stop St is arranged between front group GF and rear group GR, and that aspheric lenses are lenses L2 and L5. Regarding the material, in the wide angle lens of Example 4, four lenses of lenses L1 through L3 and L5 are made of an identical material of plastic, and lenses L4, L6 and L7 are made of glass. Table 7 and Table 8 show basic lens data and aspherical coefficients of Example 4, respectively. Please note that the value of m in aspherical coefficient Am is 4, 6, 8 and 10 in the wide angle lens of Example 4. FIG. 10, Sections A through C illustrate aberration diagrams of a spherical aberration, curvature of field, and distortion of the wide angle lens in Example 4, respectively, when the wide angle lens is focused on an object at infinity.

TABLE 7 f = 2.397, Bf = 2.575, FNo. = 2.102, 2ω = 107.189°

| Si | Ri | Di | Ndi | vdj |
|---|---|---|---|---|
| 1 | 11.2667 | 0.750 | 1.53450 | 55.7 |
| 2 | 2.8419 | 1.300 | 1.00000 | |
| 3* | 14.4549 | 1.000 | 1.53450 | 55.7 |
| 4* | 2.4190 | 1.200 | 1.00000 | |
| 5 | 31.3361 | 2.500 | 1.53450 | 55.7 |
| 6 | −9.8855 | 0.170 | 1.00000 | |
| 7(St) | ∞ | 0.280 | 1.00000 | |
| 8 | 4.3648 | 0.750 | 1.85026 | 32.3 |
| 9 | 3.0157 | 0.200 | 1.00000 | |
| 10* | 3.9751 | 2.700 | 1.53450 | 55.7 |
| 11* | −3.7399 | 1.020 | 1.00000 | |
| 12 | 5.2671 | 2.380 | 1.61800 | 63.4 |
| 13 | −3.7569 | 0.100 | 1.00000 | |
| 14 | −3.4754 | 1.190 | 1.92286 | 20.9 |
| 15 | −43.9340 | 0.200 | 1.00000 | |
| 16 | ∞ | 0.300 | 1.51633 | 64.1 |
| 17 | ∞ | 1.730 | 1.00000 | |
| 18 | ∞ | 0.500 | 1.51633 | 64.1 |
| 19 | ∞ | 0.092 | 1.00000 | |
| 20(IMG) | ∞ | | | |

TABLE 8

| SURFACE | κ | A4 | A6 | A8 | A10 |
|---|---|---|---|---|---|
| 3* | 1.00000E+00 | −2.52451E−06 | 1.72383E−08 | 4.92897E−13 | 1.05850E−17 |
| 4* | 1.00000E+00 | 2.75594E−04 | −5.18352E−10 | −2.41649E−14 | −3.63330E−19 |
| 10* | 1.00000E+00 | 6.68242E−04 | −8.64328E−09 | −6.21435E−14 | −2.24531E−19 |
| 11* | 1.00000E+00 | 9.57207E−04 | −6.00869E−09 | 2.12425E−14 | 5.33430E−19 |

Example 5

FIG. 5 is a diagram illustrating the lens configuration of a wide angle lens in Example 5. The schematic configuration of the wide angle lens in Example 5 is substantially similar to the configuration of the wide angle lens in Example 1. Regarding the material, in the wide angle lens of Example 5, four lenses of lenses L1 through L3 and L5 are made of an identical material of plastic, and lenses L4, L6 and L7 are made of glass. Table 9 and Table 10 show basic lens data and aspherical coefficients of Example 5, respectively. FIG. 11, Sections A through C illustrate aberration diagrams of a spherical aberration, curvature of field, and distortion of the wide angle lens in Example 5, respectively, when the wide angle lens is focused on an object at infinity.

TABLE 9 f = 2.302, Bf = 2.764, FNo. = 2.100, 2ω = 109.292°

| Si | Ri | Di | Ndi | vdj |
|---|---|---|---|---|
| 1 | 9.4935 | 1.000 | 1.50956 | 56.5 |
| 2* | 2.7640 | 1.300 | 1.00000 | |
| 3 | 9.4935 | 1.000 | 1.50956 | 56.5 |
| 4* | 2.7640 | 1.300 | 1.00000 | |
| 5 | −10.3061 | 2.500 | 1.50596 | 56.5 |
| 6 | −8.0000 | 0.450 | 1.00000 | |
| 7 | 3.3037 | 0.750 | 1.80000 | 29.9 |
| 8 | 2.6351 | 0.400 | 1.00000 | |
| 9* | 4.4585 | 2.500 | 1.50956 | 56.5 |
| 10* | −4.0654 | 0.100 | 1.00000 | |
| 11(St) | ∞ | 0.920 | 1.00000 | |
| 12 | 8.1460 | 2.300 | 1.80400 | 46.6 |
| 13 | −3.4346 | 0.180 | 1.00000 | |
| 14 | −2.9953 | 1.000 | 1.92286 | 18.9 |
| 15 | −15.7174 | 0.200 | 1.00000 | |
| 16 | ∞ | 0.300 | 1.51633 | 64.1 |
| 17 | ∞ | 1.730 | 1.00000 | |
| 18 | ∞ | 0.500 | 1.51633 | 64.1 |
| 19 | ∞ | 0.307 | 1.00000 | |
| 20(IMG) | ∞ | | | |

TABLE 10

| SURFACE | κ | A4 | A6 | A8 | A10 | A12 |
|---|---|---|---|---|---|---|
| 2* | 1.00000E+00 | 2.20608E−04 | 4.23305E−08 | 1.00712E−12 | 1.81576E−17 | 2.93434E−22 |
| 4* | 1.00000E+00 | 2.20608E−04 | 4.23305E−08 | 1.00712E−12 | 1.81576E−17 | 2.93434E−22 |
| 9* | 1.00000E+00 | −3.10808E−03 | 6.03229E−09 | 2.16407E−13 | 1.59861E−18 | |
| 10* | 1.00000E+00 | −4.06696E−04 | 5.63126E−08 | 3.87544E−13 | 1.67366E−18 | |

Example 6

FIG. 6 is a diagram illustrating the lens configuration of a wide angle lens in Example 6. The schematic configuration of the wide angle lens in Example 6 is substantially similar to the configuration of the wide angle lens in Example 1. Example 6 differs from Example 1 in that the entire system consists of five lenses, and that lens L1 has a biconcave shape, and that lens L3 has a biconvex shape, and that rear group GR consists of lens L4 having a biconvex shape and lens L5 having a negative meniscus shape with its concave surface facing the object side in this order from the object side, and that aperture stop St is arranged between lens L2 and lens L3, and that aspheric lenses are lenses L1 through L4, and that four lenses of lenses L1 through L4 are made of an identical material of plastic, and that lens L5 is made of glass. Table 11 and Table 12 show basic lens data and aspherical coefficients of Example 6, respectively. FIG. 12, Sections A through C illustrate aberration diagrams of a spherical aberration, curvature of field, and distortion of the wide angle lens in Example 6, respectively, when the wide angle lens is focused on an object at infinity.

TABLE 11 f = 2.651, Bf = 3.765, FNo. = 2.561, 2ω = 109.062°

| Si | Ri | Di | Ndi | vdj |
|---|---|---|---|---|
| 1 | −31.6577 | 1.000 | 1.53450 | 55.7 |
| 2* | 3.4693 | 1.300 | 1.00000 | |
| 3* | 11.3550 | 1.000 | 1.53450 | 55.7 |
| 4* | 3.3249 | 3.580 | 1.00000 | |
| 5(St) | ∞ | 0.100 | 1.00000 | |
| 6* | 4.6849 | 2.870 | 1.53450 | 55.7 |
| 7* | −4.8294 | 1.020 | 1.00000 | |
| 8* | 6.5134 | 2.300 | 1.53450 | 55.7 |
| 9* | −2.8574 | 0.180 | 1.00000 | |
| 10 | −2.7840 | 1.000 | 1.94595 | 18.0 |
| 11 | −8.9946 | 0.200 | 1.00000 | |
| 12 | ∞ | 0.300 | 1.51633 | 64.1 |
| 13 | ∞ | 1.730 | 1.00000 | |
| 14 | ∞ | 0.500 | 1.51633 | 64.1 |
| 15 | ∞ | 1.308 | 1.00000 | |
| 16(IMG) | ∞ | | | |

TABLE 12

| SURFACE | κ | A4 | A6 | A8 | A10 | A12 |
|---|---|---|---|---|---|---|
| 2* | 1.00000E+00 | 2.44682E−04 | 3.14019E−08 | 8.19535E−13 | 1.58276E−17 | 2.44350E−22 |
| 3* | 1.00000E+00 | 8.37611E−04 | −1.40781E−07 | −4.49003E−12 | −8.27799E−17 | |
| 4* | 1.00000E+00 | 9.33589E−04 | 1.12965E−07 | 2.21873E−12 | 3.21265E−17 | 2.44350E−22 |
| 6* | 1.00000E+00 | −2.81468E−03 | −5.24099E−07 | −4.95193E−12 | −3.60166E−17 | |
| 7* | 1.00000E+00 | 2.84170E−03 | 4.50004E−07 | 4.79669E−12 | 3.81336E−17 | |
| 8* | 1.00000E+00 | 3.39812E−03 | −1.26824E−07 | −1.68209E−13 | 9.00907E−18 | |
| 9* | 1.00000E+00 | 5.61358E−03 | 5.74159E−08 | −4.58356E−13 | −1.51975E−17 | |

Table 13 shows values corresponding to conditional expressions (1) through (4) for Examples 1 through 6. Table 13 shows values for d-line.

TABLE 13

| | (1) NF | (2) vF | (3) fng/f | (4) vng |
|---|---|---|---|---|
| EXAMPLE 1 | 1.50956 | 56.5 | −1.752 | 18.9 |
| EXAMPLE 2 | 1.53450 | 55.7 | −1.959 | 18.0 |
| EXAMPLE 3 | 1.53450 | 55.7 | −1.938 | 18.0 |
| EXAMPLE 4 | 1.53450 | 55.7 | −1.730 | 20.9 |
| EXAMPLE 5 | 1.50956 | 56.5 | −1.789 | 18.9 |
| EXAMPLE 6 | 1.53450 | 55.7 | −1.745 | 18.0 |

Figure 13:
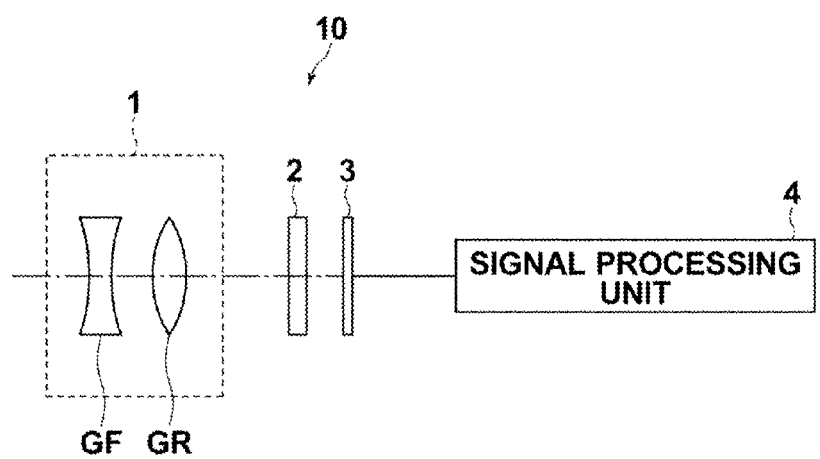
FIG. 13 is a schematic diagram illustrating the configuration of an imaging apparatus according to an embodiment of the present invention.

Next, with reference to FIG. 13, an imaging apparatus according to an embodiment of the present invention will be described. FIG. 13 is a schematic diagram illustrating the configuration of an imaging apparatus 10 using a wide angle lens 1 according to an embodiment of the present invention, as an example of an imaging apparatus according to an embodiment of the present invention. Examples of the imaging apparatus are a camera for a mobile terminal, an in-vehicle camera, a surveillance camera and the like.

The imaging apparatus 10 illustrated in FIG. 13 includes a wide angle lens 1 consisting of front group GF and rear group GR, a filter 2 arranged toward the image side of the wide angle lens 1, an imaging device 3 that images an image of a subject formed by the wide angle lens 1, and a signal processing unit 4. In FIG. 13, front group GF and rear group GR are schematically illustrated. Here, front group GF in FIG. 13 has a biconcave shape. However, front group GF is not necessarily limited to a negative lens group.

The imaging device 3 images an image of a subject formed by the wide angle lens 1, and converts the image into electrical signals. The imaging device 3 is arranged in such a manner that its imaging surface is matched with the image plane of the wide angle lens 1. For example, a CCD (Charge Coupled Device), a CMOS (Complementary Metal Oxide Semiconductor) and the like may be used as the imaging device 3. The signal processing unit 4 performs operation processing on signals output from the imaging device 3.

So far, the present invention has been described by using embodiments and examples. However, the present invention is not limited to the aforementioned embodiments and examples, and various modifications are possible. For example, the values of a curvature radius, a distance between surfaces, a refractive index, an Abbe number, aspherical coefficients and the like of each lens are not limited to the values in the aforementioned numerical value examples, and may be other values.

What is claimed is:

1. A wide angle lens consisting of:
a front group; and
a rear group in this order from an object side,
wherein the front group consists of three lenses of two negative lenses and a positive lens in this order from the object side, and all of the three lenses are made of an identical material, the material of all of the three lenses of the front group having identical Abbe numbers,
wherein the rear group consists of two or more and four or less lenses, and includes at least one positive lens and at least one negative lens, and a lens closest to an image side in the rear group is a negative lens, and the material of the negative lens closest to the image side in the rear group is glass, and
wherein the following conditional expressions (1) and (4) are satisfied:

$1.48 < NF < 1.6$ (1); and $15 < vng < 25$ (4), where a refractive index for d-line of the material of the lenses constituting the front group is NF, and an Abbe number for d-line of the material of the negative lens closest to the image side in the rear group is vng.

2. The wide angle lens, as defined in claim 1, wherein the following conditional expression (2) is satisfied:

$50 < vF < 65$ (2), where an Abbe number for d-line of the material of the lenses constituting the front group is vF.

3. The wide angle lens, as defined in claim 1, wherein the material of the lenses constituting the front group is plastic.

4. The wide angle lens, as defined in claim 1, wherein the following conditional expression (3) is satisfied:

$-2.2 < fng/f < -1.5$ (3), where a focal length of the negative lens closest to the image side in the rear group is fng, and a focal length of an entire system is f.

5. The wide angle lens, as defined in claim 1, wherein the material of the at least one positive lens included in the rear group is the same as the material of the lenses in the front group.

6. The wide angle lens, as defined in claim 3, wherein the material of at least one lens included in the rear group is plastic, and
all of plastic lenses included in the front group and the rear group are made of an identical material.

7. The wide angle lens, as defined in claim 6, wherein the plastic lenses included in the front group and the rear group are two negative lenses and at least two positive lenses.

8. The wide angle lens, as defined in claim 1, wherein the following conditional expression (1') is satisfied:

$1.49 \leq NF < 1.57$ (1').

9. The wide angle lens, as defined in claim 2, wherein the following conditional expression (2') is satisfied:

$53 < vF < 58$ (2').

10. The wide angle lens, as defined in claim 4, wherein the following conditional expression (3a) is satisfied:

$-1.959 \leq fng/f < -1.5$ (3a).

11. The wide angle lens, as defined in claim 4, wherein the following conditional expression (3') is satisfied:

$-2.1 < fng/f < -1.6$ (3').

12. The wide angle lens, as defined in claim 4, wherein the following conditional expression (3' a) is satisfied:

$-1.959 \leq fng/f < -1.6$ (3'a).

13. The wide angle lens, as defined in claim 1, wherein the following conditional expression (4') is satisfied:

$17 < vng < 24$ (4').

14. An imaging apparatus comprising:
the wide angle lens, as defined in claim 1.

* * * * *